(12) United States Patent  (10) Patent No.: US 8,953,170 B2
Usami et al.  (45) Date of Patent: Feb. 10, 2015

(54) WHITE-LIGHT INTERFEROMETRIC MEASURING DEVICE

(71) Applicant: Mitutoyo Corporation, Kanagawa (JP)

(72) Inventors: Atsushi Usami, Kanagawa (JP); Tatsuya Nagahama, Kanagawa (JO)

(73) Assignee: Mitutoyo Corporation, Kanagawa (JP)

( * ) Notice: Subject to any disclaimer, the term of this patent is extended or adjusted under 35 U.S.C. 154(b) by 92 days.

(21) Appl. No.: 13/782,084

(22) Filed: Mar. 1, 2013

(65) Prior Publication Data

US 2013/0242311 A1 Sep. 19, 2013

(30) Foreign Application Priority Data

Mar. 16, 2012 (JP) ................. 2012-059993

(51) Int. Cl.
*G01B 9/02* (2006.01)
*G01B 9/04* (2006.01)

(52) U.S. Cl.
CPC ........ *G01B 9/02075* (2013.01); *G01B 9/02007* (2013.01); *G01B 9/0209* (2013.01); *G01B 9/04* (2013.01); *G01B 9/02058* (2013.01); *G01B 2290/70* (2013.01)
USPC .......................................... 356/492; 356/450

(58) Field of Classification Search
USPC ......... 356/492, 495, 497, 500, 503, 511–514, 356/516; 359/370–371
See application file for complete search history.

(56) References Cited

U.S. PATENT DOCUMENTS

| 5,602,399 A * | 2/1997 | Mizutani ................. 250/548 |
| 6,285,456 B1 * | 9/2001 | Narumi ................. 356/497 |
| 2006/0158659 A1 | 7/2006 | Colonna De Lega et al. |
| 2007/0046953 A1 | 3/2007 | De Groot et al. |

FOREIGN PATENT DOCUMENTS

| JP | 2006-349382 | 12/2006 |
| JP | 2011-085413 | 4/2011 |

OTHER PUBLICATIONS

Jing-Tao Dong et al., "Achromatic phase shifter with eight times magnification of rotation angle in low coherence interference microscopy", Applied Optics, Optical Society of America, Washington, DC; US, vol. 50, No. 8, XP001561047, Mar. 10, 2011, pp. 1113-1123.
Search report from E.P.O., mail date is Jun. 28, 2013.

* cited by examiner

*Primary Examiner* — Tri T Ton
(74) *Attorney, Agent, or Firm* — Greenblum & Bernstein, P.L.C.

(57) ABSTRACT

A white-light interferometric measuring device includes: a white light source that emits a white light beam; a beam splitter that reflects the white light beam; and an interference objective lens that collects the white light beam having reflected off the beam splitter in the direction of an optical axis and irradiates a measurement workpiece with the white light beam, the interference objective lens generating interference between a measurement light beam obtained by reflection of the white light beam off the measurement workpiece and a reference light beam obtained by branching of the white light beam to be converged on the measurement workpiece. Polarization correcting means that corrects the white light beam to enter the interference objective lens to circularly polarized light is arranged between the white light source and the interference objective lens.

8 Claims, 5 Drawing Sheets

PRIOR ART

PRIOR ART

Fig. 10B

WHITE-LIGHT INTERFEROMETRIC MEASURING DEVICE

CROSS-REFERENCE TO RELATED APPLICATION

The disclosure of Japanese Patent Application No. 2012-59993 filed on Mar. 16, 2012 including specifications, drawings and claims is incorporated herein by reference in its entirety.

TECHNICAL FIELD

The present invention relates to a white-light interferometric measuring device, and more specifically, to a white-light interferometric measuring device capable of enhancing measuring accuracy and measuring efficiency by reducing variation in measured value due to difference of the orientation of a measurement workpiece.

BACKGROUND ART

Figure 8:
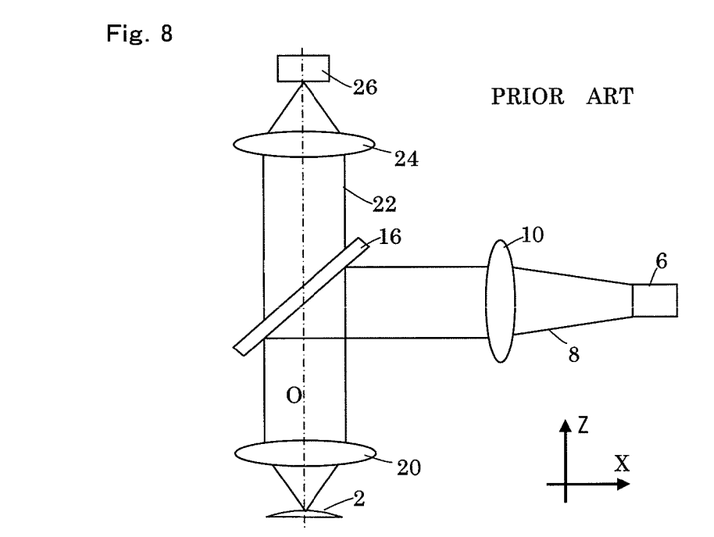
FIG. 8 is a schematic view showing the outline of a white-light interferometric measuring device according to a conventional technology.

A white-light interferometric measuring device using broadband light (white light) as a light source is widely known as one of conventional interferometric measuring devices for measuring the three-dimensional shape of a measurement workpiece accurately by using an intensity information about an interference pattern generated by interference of light. As an example thereof, FIG. 8 shows the outline of the structure of a white-light interferometric measuring device described in Japanese Patent Application Laid-Open No. 2011-85413 (hereinafter called patent literature 1). The white-light interferometric measuring device of FIG. 8 includes a white light source 6 that emits a white light beam 8, a beam splitter 16 that reflects the white light beam 8, and an interference objective lens 20. The interference objective lens 20 collects the white light beam 8 having reflected off the beam splitter 16 in the direction of an optical axis O and irradiates a measurement workpiece 2 with the white light beam 8. The interference objective lens 20 also generates interference between a measurement light beam obtained by reflection of the white light beam 8 off the measurement workpiece 2 and a reference light beam obtained by branching of the white light beam 8 to be converged on the measurement workpiece 2. Reference numerals 10, 22, 24 and 26 indicate a collimator lens, an interference light beam, an imaging lens, and a light receiving element.

Figure 9A:
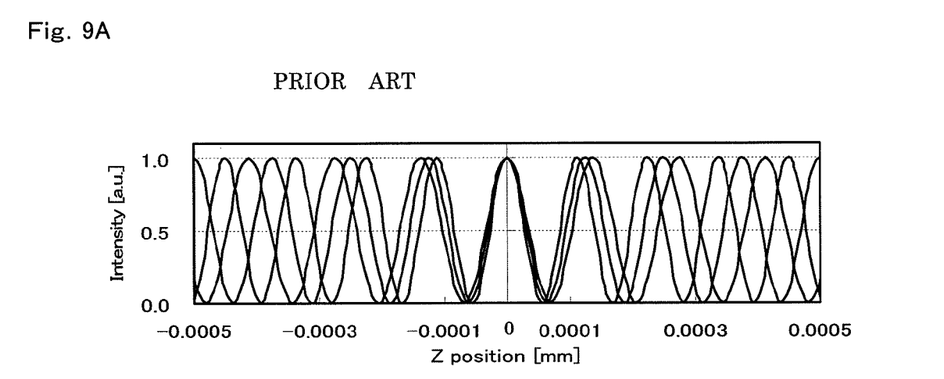
FIGS. 9A and 9B are schematic views explaining the resolution in the Z direction of a white-light interferometric measuring device.
Figure 9B:
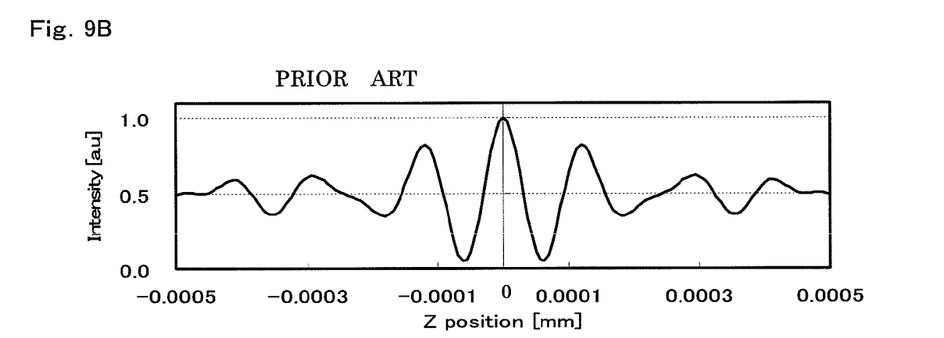

A description will be given of the fact that high resolution can be achieved in a height direction (Z direction) by using interference of white light, with reference to FIGS. 9A and 9B. FIG. 9A shows intensity distributions of interference patterns in the Z direction obtained at respective wavelengths of white light. FIG. 9B shows an intensity distribution of an interference pattern in the Z direction obtained as a result of combination of the interference patterns of all the wavelengths. As shown in FIG. 9A, the maximum values of the interference patterns of the respective wavelengths overlap at a focal position of the interference objective lens 20 in the Z direction (Z=0), and the phases of the respective wavelengths shift more with a greater distance from the focal position. Therefore, as shown in FIG. 9B, the intensity of the combined interference pattern becomes maximum at the focal position, and becomes lower gradually while oscillating with a greater distance from the focal position. Thus, the white-light interferometric measuring device is capable of measuring the three-dimensional shape of the measurement workpiece 2 accurately within the field of view of the interference objective lens 20 by detecting a position in the Z direction where the intensity becomes maximum at each position within the field of view of the interference objective lens 20.

SUMMARY OF INVENTION

Technical Problem

Figure 10A:
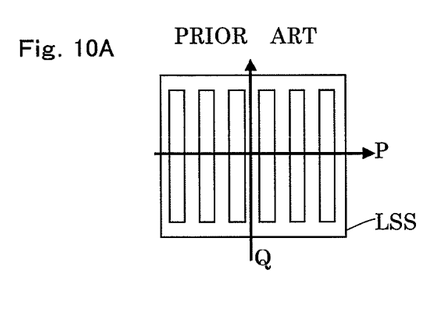
FIGS. 10A and 10B are a top view and a sectional view taken in a direction P, respectively, schematically showing an example of a measurement workpiece wherein variation in measured value occurs due to difference of the orientation of the measurement workpiece in the white-light interferometric measuring device according to a conventional technology.
Figure 10B:
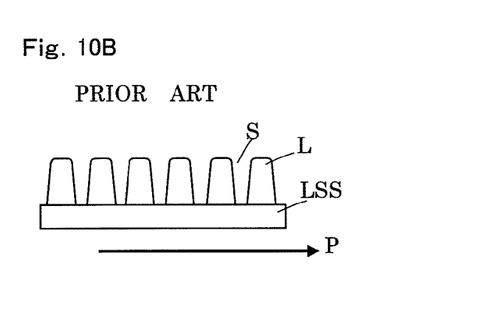

However, the inventors have found that there is fear of variation in measured value due to difference of the orientation of the measurement workpiece 2 if the measurement workpiece 2 is measured by the white-light interferometric measuring device of in FIG. 8. As an example, a sample composed of fine lines L (of a width of some micrometers) and fine spaces S (of a width of some micrometers) (this sample is hereinafter called an L/S sample LSS) shown in FIGS. 10A and 10B is measured as the measurement workpiece 2. In this case, a measured value varies (to a degree similar to the degree of variation to occur depending on optical resolution or the size of a light receiving element) between the case where a direction P of the L/S sample LSS of FIG. 10A is made to agree with a specific direction (such as X direction) of the white-light interferometric measuring device and the case where a direction Q of the L/S sample LSS is made to agree with the specific direction (such as X direction) of the white-light interferometric measuring device, for example.

This may be resolved by providing a mechanism for rotating the measurement workpiece 2 at a position where the measurement workpiece 2 is placed, and controlling the position of the measurement workpiece 2 with this mechanism. However, this in turn leads to cost increase of the device and reduction in measuring efficiency due to the necessity to control the position.

The present invention has been made to solve the aforementioned problems. It is an object of the invention to provide a white-light interferometric measuring device capable of enhancing measuring accuracy and measuring efficiency by reducing variation in measured value due to difference of the orientation of a measurement workpiece.

Solution to Problem

The present invention according to claim 1 of the present application is directed to a white-light interferometric measuring device, including: a white light source that emits a white light beam; a beam splitter that reflects the white light beam; and an interference objective lens that collects the white light beam having reflected off the beam splitter in a direction of an optical axis and irradiates a measurement workpiece with the white light beam, the interference objective lens generating interference between a measurement light beam obtained by reflection of the white light beam off the measurement workpiece and a reference light beam obtained by branching of the white light beam to be converged on the measurement workpiece. The white-light interferometric measuring device further include polarization correcting means that corrects the white light beam to enter the interference objective lens to circularly polarized light, the polarization correcting means being arranged between the white light source and the interference objective lens, thereby achieving the aforementioned object.

In the invention according to claim 2 of the present application, the polarization correcting means includes the beam splitter having a reflection surface for the white light beam on which a dielectric film is formed, a polarizing plate arranged between the white light source and the beam splitter, and a quarter-wave plate arranged between the beam splitter and the interference objective lens.

In the invention according to claim 3 of the present application, the polarization correcting means includes the beam splitter being a non-polarizing beam splitter, and a polarizing plate and a quarter-wave plate arranged between the white light source and the beam splitter.

In the invention according to claim 4 of the present application, the beam splitter is a cube beam splitter.

In the invention according to claim 5 of the present application, the beam splitter is a beam splitter with bonded glasses.

In the invention according to claim 6 of the present application, the white-light interferometric measuring device includes a collimator lens arranged between the white light source and the beam splitter, and an imaging lens arranged between the beam splitter and a light receiving element.

In the invention according to claim 7 of the present application, the interference objective lens has a focus directly formed on the white light source and a light receiving element.

Advantageous Effects of Drawings

According to the present invention, measuring accuracy and measuring efficiency can be enhanced by reducing variation in measured value due to difference of the orientation of the measurement workpiece.

BRIEF DESCRIPTION OF DRAWINGS

The preferred embodiments will be described with reference to the drawings, wherein like elements have been denoted throughout the figures with like reference numerals, and wherein.

DESCRIPTION OF EMBODIMENTS

An example of an embodiment of the present invention will next be described in detail with reference to the drawings.

The structure of a white-light interferometric measuring device according to a first embodiment will be described first by referring mainly to FIGS. 1 and 2.

A white-light interferometric measuring device 100 includes a lens barrel 104, and a white light source 106, a collimator lens 110, a polarization correcting part 112 being polarization correcting means, an interference objective lens 120, an imaging lens 124, and a light receiving element 126, which are housed in the lens barrel 104. As an example, a measurement workpiece 102 is placed on an XY stage not shown in the drawings, and can be scanned two dimensionally with regard to a Z direction. The lens barrel 104 is movable on a Z stage not shown in the drawings. The XY stage and the Z stage are fixed on a base not shown in the drawings, and are controlled by a controller not shown in the drawings. To be specific, the white-light interferometric measuring device 100 is free from limitations by the field of view of the interference objective lens 120 in measuring the three-dimensional shape of the measurement workpiece 102. The XY stage is not a fundamental structure. The measurement workpiece 102 may be caused to move on the Z stage.

Figure 1:
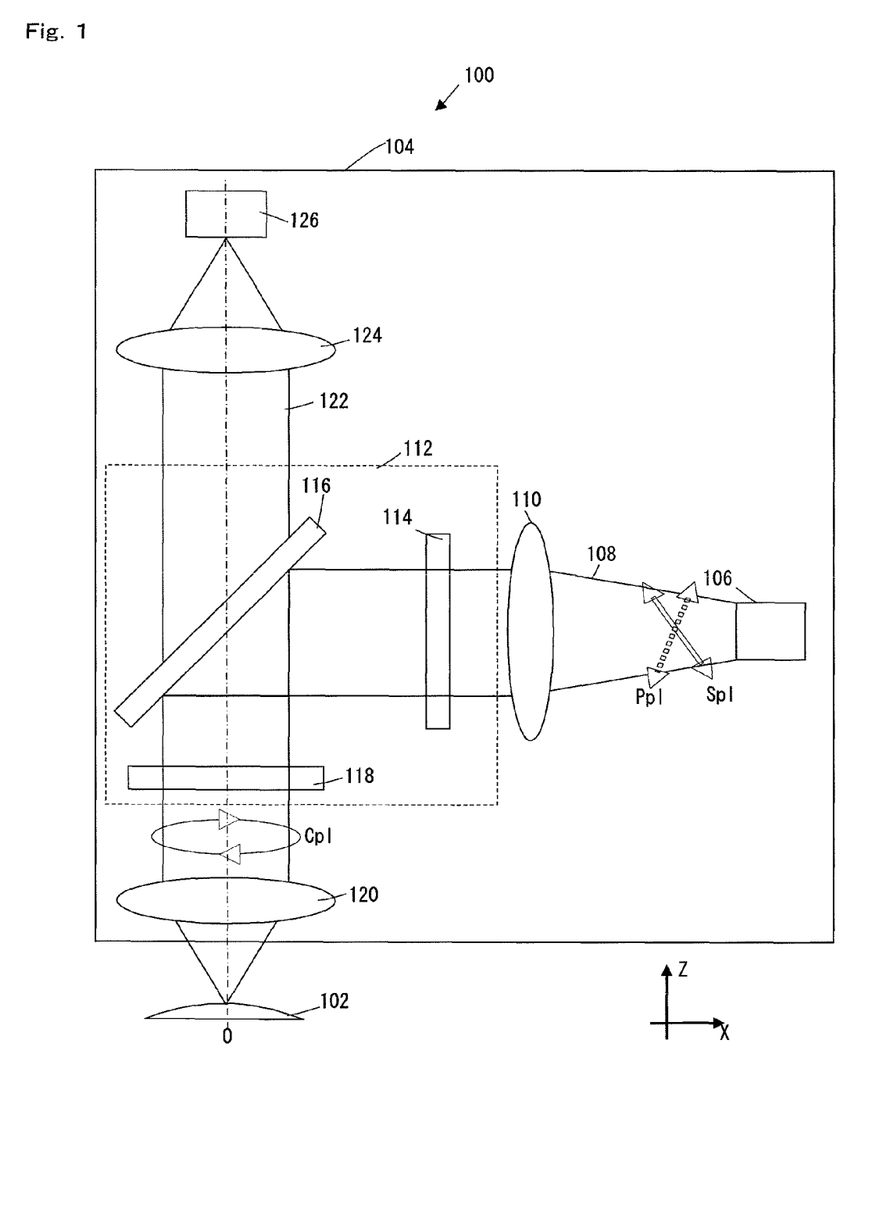
FIG. 1 is a schematic view showing the outline of a white-light interferometric measuring device according to a first embodiment of the invention.
Figure 2A:
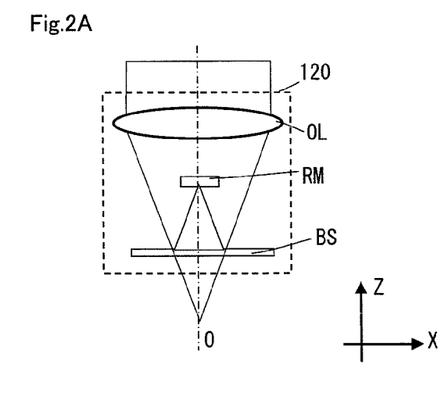
FIGS. 2A and 2B are schematic views showing the outlines of a Mirau interference objective lens and a Michelson interference objective lens of the white-light interferometric measuring device, respectively.
Figure 2B:
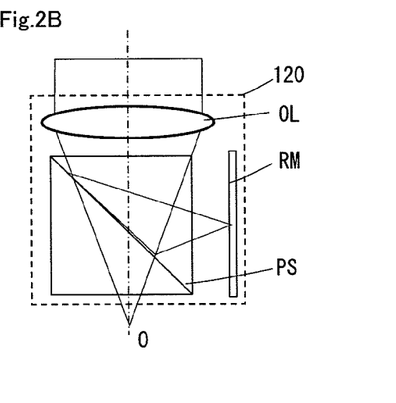

As shown in FIG. 1, the white light source 106 emits a white light beam 108. The white light source 106 is a halogen light source that can emit natural light, for example. The white light beam 108 is a diffused light beam, and is in a condition (condition of unpolarized light) where a phase relationship between two orthogonal polarization components of light waves (P-polarized light Pp1 indicated by hollow dotted arrows and S-polarized light Sp1 indicated by hollow arrows) is randomly determined. The collimator lens 110 converts the white light beam 108 entering the collimator lens 110 to a collimated light beam as shown in FIG. 1. The white light beam 108 is still unpolarized light when it exits the collimator lens 110.

As shown in FIG. 1, the polarization correcting part 112 is arranged between the collimator lens 110 and the interference objective lens 120, and includes a polarizing plate 114, a beam splitter 116, and a quarter-wave plate 118. The polarizing plate 114 converts the unpolarized white light beam 108 having exited the collimator lens 110 to linearly polarized light. To be specific, the polarizing plate 114 generates imbalance in advance between the P-polarized light Pp1 and the S-polarized light Sp1. The polarizing plate 114 may be arranged between the collimator lens 110 and the white light source 106. The beam splitter 116 reflects the linearly polarized white light beam 108 to direct in the direction of an optical axis O toward the interference objective lens 120. A dielectric film is deposited (formed) on a surface of the beam splitter 116 for reflection of the white light beam 108, so that the beam splitter 116 can be a beam splitter used in a common illumination optical system. Thus, as a result of reflection of the white light beam 108 off the beam splitter 116, the P-polarized light Pp1 attenuates more than the S-polarized light Sp1 to generate imbalance between the P-polarized light Pp1 and the S-polarized light Sp1. Meanwhile, the polarizing plate 114 generates imbalance in advance between the P-polarized light Pp1 and the S-polarized light Sp1, thereby reducing effect of imbalance between the polarization components occurring as a result of reflection by the beam splitter 116. The quarter-wave plate 118 is a birefrigent element that generates a phase difference of 90 degrees between two orthogonal polarization components. Thus, the quarter-wave plate 118 can convert the linearly polarized white light beam 108 having reflected off the beam splitter 116 to the white light beam 108 being circularly polarized light Cp1 (ring with hollow arrows). To be specific, the polarization correcting part 112 can correct the white light beam 108 that enters the interference objective lens 120 to the circularly polarized light free from imbalance between the P-polarized light Pp1 and the S-polarized light Sp1.

As shown in FIG. 1, the interference objective lens 120 collects the white light beam 108 having reflected off the beam splitter 116 in the direction of the optical axis O through the quarter-wave plate 118 and irradiates the measurement workpiece 102 with the white light beam 108. As shown in FIGS. 2A and 2B, the interference objective lens 120 includes an objective lens OL, a reference mirror RM, and a beam splitter BS (or a prism PS). The objective lens OL collects the collimated light beam (white light beam 108) and irradiates the measurement workpiece 102 with the collected light beam. Therefore, the white light beam 108 converged on the measurement workpiece 102 is free from imbalance between the P-polarized light Pp1 and the S-polarized light Sp1. The beam splitter BS (or prism PS) reflects part of the collimated light beam (white light beam 108) to be converged on the measurement workpiece 102, thereby generating a reference light beam. (To be specific, the reference light beam is obtained by branching of the white light beam 108 to be collected). The reference mirror RM is arranged at a focal position of the reference light beam and reflects the reference light beam. The reference light beam having reflected off the reference mirror RM is coupled to a measurement light beam at the beam splitter BS (or prism PS) that is obtained by reflection of the white light beam 108 off the measurement workpiece 102. An interference light beam 122 obtained by coupling the measurement light beam and the reference light beam travels back to the direction of the beam splitter 116 along the optical axis O. The interference objective lens 120 of FIG. 2A is a Mirau interference objective lens in which the reference mirror RM and the beam splitter BS are arranged on the optical axis O, and is mainly applicable to achieve a high magnification. The interference objective lens 120 of FIG. 2B is a Michelson interference objective lens in which the reference mirror RM is arranged outside the optical axis O and the prism PS is arranged on the optical axis O, and is mainly applicable to achieve a magnification lower than that of the Mirau interference objective lens.

As shown in FIG. 1, the imaging lens 124 forms an image of the interference light beam 122 having passed through the beam splitter 116. The light receiving element 126 includes pixels arranged two dimensionally, and receives an interference pattern formed as a result of the image formation by the imaging lens 124.

The interference pattern resulting from the interference light beam 122 is generated by a difference in shape between the measurement workpiece 102 and the reference mirror RM. In the present embodiment, the white light beam 108 converged on the measurement workpiece 102 is a high-quality circularly polarized illumination light beam, making it possible to obtain the interference light beam 122 with homogeneity. To be specific, in the present embodiment, correcting the white light beam 108 to be converged on the measurement workpiece 102 to circularly polarized light is intended to obtain a high-quality illumination light beam, and not to prevent generation of stray light or reflecting light between the interference objective lens 120 and the light receiving element 126. Even if such stray light or reflecting light is generated, the white-light interferometric measuring device 100 of the present embodiment employing the principles of interference of white light can measure the measurement workpiece 102 with high resolution while preventing serious effect on a contrast of the interference pattern. (This produces the significance of existence of a second embodiment described later using a cube beam splitter.)

Figure 3:
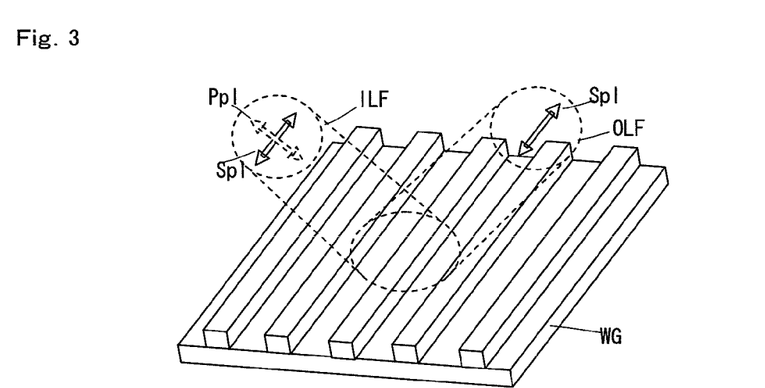
FIG. 3 is a schematic view showing the behavior of a wire grid polarizer.

Like the beam splitter 116 of the first embodiment, the beam splitter 16 of FIG. 8 relating to the conventional technology generally has a reflection surface on which a dielectric film is deposited. Thus, in the conventional technology, imbalance is generated between P-polarized light Pp1 and S-polarized light Sp1 of the white light beam 8 to enter the interference objective lens 20. If this imbalance is not corrected and the white light beam 8 is used as it is for measurement of the L/S sample LSS of FIG. 10, a resultant phenomenon is considered to be similar to that generated as a result of irradiation of a wire grid polarizer WG with light as shown in FIG. 3. (The wire grid polarizer WG causes P-polarized light Pp1 of an incident light beam ILF to pass therethrough, so that a reflected light beam OLF only contains S-polarized light Sp1). To be specific, in the conventional technology, imbalance between the P-polarized light Pp1 and the S-polarized light Sp1 is still generated in the white light beam 8 with which the L/S sample LSS is irradiated. Therefore, it is considered that variation in measured value occurs due to difference of the orientation of the L/S sample LSS in the intensity of a measurement light beam obtained by reflection of the white light beam 8 off the L/S sample LSS.

In contrast, while the structure of the present embodiment is such that a dielectric film is deposited on the beam splitter 116 as in the conventional technology, the polarizing plate 114 and the quarter-wave plate 118 of the polarization correcting part 112 allow the circularly polarized white light beam 108 free from imbalance between the P-polarized light Pp1 and the S-polarized light Sp1 to enter the interference objective lens 120. Thus, even if the measurement workpiece 102 is one such as the wire grid polarizer WG of FIG. 3, variation in measured value due to difference of the orientation of the measurement workpiece 102 can be reduced. As a result, a mechanism for rotating the measurement workpiece 102 and a step of controlling the rotation are not required, and measuring accuracy and measuring efficiency are enhanced.

In the present embodiment, a particular beam splitter is not required but the beam splitter 116 can have the conventional structure. Thus, the white-light interferometric measuring device 100 can be formed at low cost.

Figure 4:
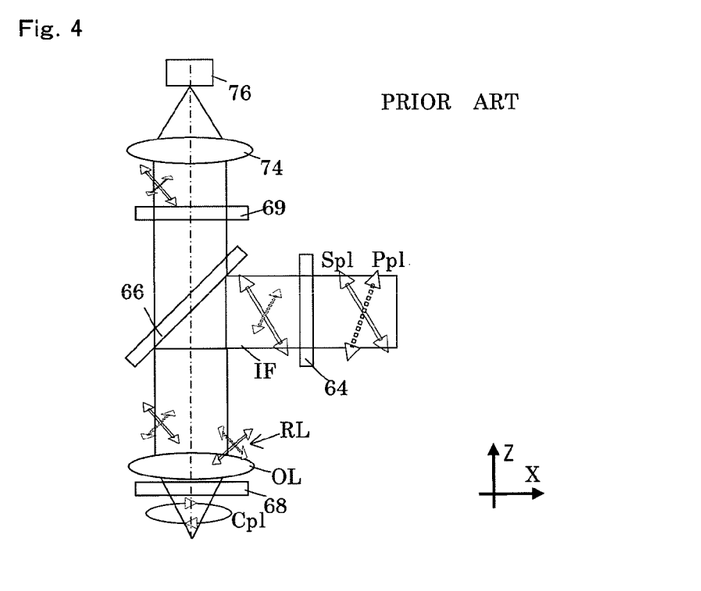
FIG. 4 is a schematic view showing a microscopic device with a polarizing plate and a quarter-wave plate.

In a microscopic device intended mainly for image observation, polarizing plates 64 and 69 and a quarter-wave plate 68 are arranged in combination, thereby making a circularly polarized illumination light beam IF enter a measurement workpiece as shown in FIG. 4. More specifically, in FIG. 4, the quarter-wave plate 68 is arranged between an objective lens OL and the measurement workpiece, and the additional polarizing plate (analyzer) 69 is arranged in front of an imaging lens 74. However, this arrangement is mainly intended to cut off a reflected light beam RL (of a converted phase) from a surface of an objective lens (not the interference objective lens 120 of the present embodiment) that might directly and seriously affect an observation image observed by a light receiving element 76. To be specific, the microscopic device of FIG. 4 has an idea and a structure devised based on this idea that are different from those of the technology of the present embodiment employing the principles of interference of white light.

The present invention has been described by exemplifying the first embodiment described above, but is not intended to be limited to the first embodiment. Modifications and design changes can certainly be made without departing from the range of the gist of the present invention.

As an example, in the first embodiment, the polarization correcting part 112 includes the beam splitter 116 on which a dielectric film is formed, the polarizing plate 114 arranged between the collimator lens 110 and the beam splitter 116, and the quarter-wave plate 118 arranged between the beam splitter 116 and the interference objective lens 120. However, the present invention is not limited thereto. The invention can also be embodied as in a second embodiment shown in FIG. 5, for example. Here, only a polarization correcting part 212 different from that of the first embodiment is described, and the structure in other respects is not described again to avoid duplication.

Figure 5:
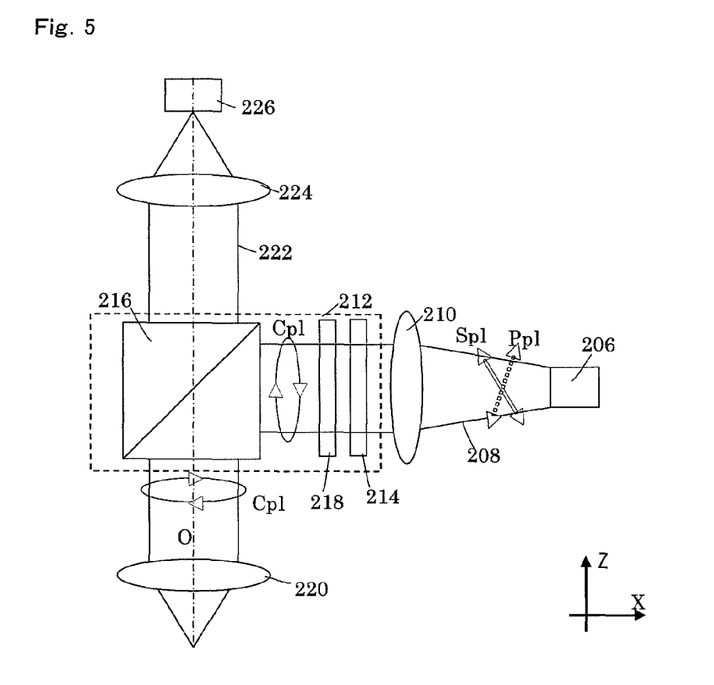
FIG. 5 is a schematic view showing the outline of a white-light interferometric measuring device according to a second embodiment of the invention.

In the second embodiment, as shown in FIG. 5 the polarization correcting part 212 includes a beam splitter 216 being a non-polarizing beam splitter, and a polarizing plate 214 and a quarter-wave plate 218 arranged between the beam splitter 216 and a collimator lens 210. (The polarizing plate 214 and the quarter-wave plate 218 may be arranged between a white light source 206 and the collimator lens 210). The beam splitter 216 is a cube beam splitter, and a metal film is formed on a surface thereof for reflection of a white light beam 208. To be specific, the unpolarized white light beam 208 having exited the collimator lens 210 is converted once to linearly polarized light by the polarizing plate 214, and then is immediately converted to circularly polarized light Cp1 by the quarter-wave plate 218. The white light beam 208 is not polarized by the beam splitter 216, so that it keeps its polarized state as the circularly polarized light Cp1 when it exits the beam splitter 216. To be specific, the white light beam 208 free from imbalance between P-polarized light Pp1 and S-polarized light Sp1 is allowed to enter an interference objective lens 220.

In the second embodiment, the advantageous effects are achieved by the structures ranging from the white light source 206 to the quarter-wave plate 218 except for the optical elements on the optical axis O. Thus, control is required only for these structures named here belonging to an illumination system, and these structures can be controlled easily.

Figure 6:
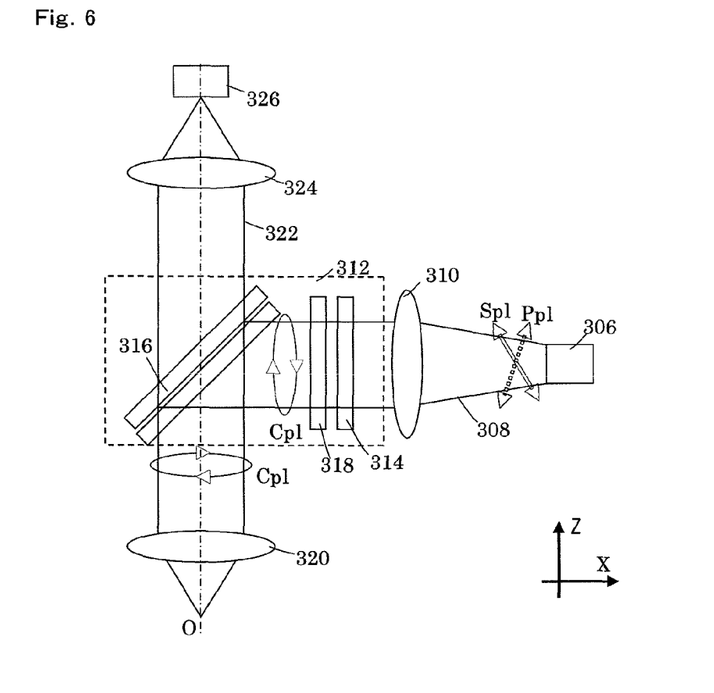
FIG. 6 is a schematic view showing the outline of a white-light interferometric measuring device according to a third embodiment of the invention.

As in a third embodiment shown in FIG. 6, a beam splitter 316 being a non-polarizing beam splitter may be a beam splitter with bonded glasses. In this case, a metal film is also formed on a surface of the beam splitter 316 for reflection of a white light beam 308. A cube beam splitter can generate flare (unnecessary light) due to reflection at the rear surface thereof, thereby generating contrast reduction of an interference pattern to be received by a light receiving element 326. However, the beam splitter 316 of the third embodiment does not generate such flare, thereby reducing the probability of contrast reduction of an interference pattern.

Figure 7:
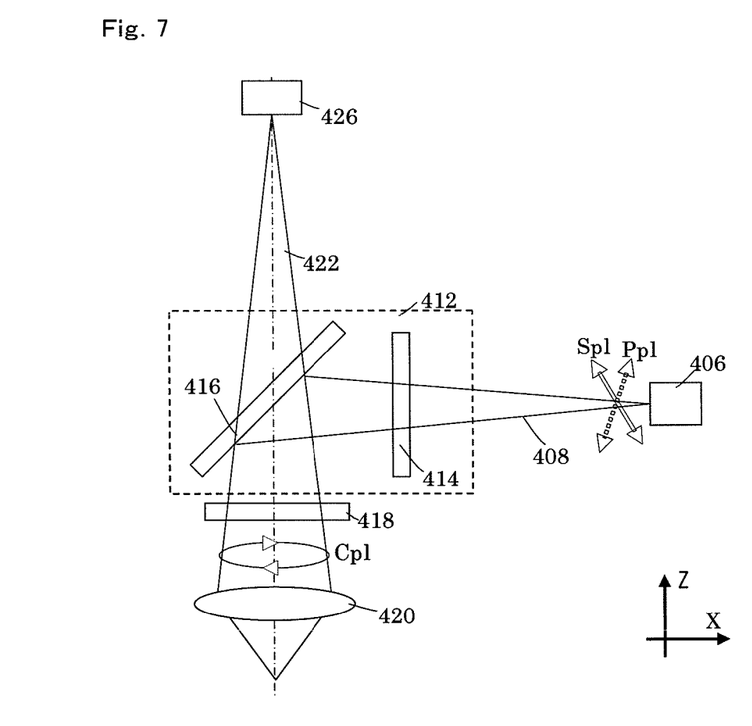
FIG. 7 is a schematic view showing the outline of a white-light interferometric measuring device according to a fourth embodiment of the invention.

The aforementioned embodiments each use a collimator lens and an imaging lens. Meanwhile, the white-light interferometric measuring device may also be configured to exclude a collimator lens and an imaging lens as in a fourth embodiment shown in FIG. 7. Unlike in the first embodiment, the focus of an interference objective lens 420 is directly formed on a white light source 406 and a light receiving element 426 in the fourth embodiment. The number of optical elements used in the fourth embodiment is reduced, making it possible to form the white-light interferometric measuring device at lower cost.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

INDUSTRIAL APPLICABILITY

The present invention is widely applicable to image measuring devices (including optical microscopes) employing interference of white light that makes a white light beam reflect off a beam splitter and makes the white light beam enter an interference objective lens.

REFERENCE SIGNS LIST 2, 102 . . . measurement workpiece
6, 106, 206, 306, 406 . . . white light source
8, 108, 208, 308, 408 . . . white light beam
10, 110, 210, 310 . . . collimator lens
16, 66, 116, 216, 316, 416 . . . beam splitter
20, 120, 220, 320, 420 . . . interference objective lens
22, 122, 222, 322, 422 . . . interference light beam
24, 74, 124, 224, 324 . . . imaging lens
26, 76, 126, 226, 326, 426 . . . light receiving element
64, 69, 114, 214, 314, 414 . . . polarizing plate
68, 118, 218, 318, 418 . . . quarter-wave plate
100 . . . white-light interferometric measuring device
104 . . . lens barrel
112, 212, 312, 412 . . . polarization correcting part

The invention claimed is:

1. A white-light interferometric measuring device comprising:
a white light source that emits a white light beam;
a beam splitter that reflects the white light beam;
an interference objective lens that collects the white light beam having reflected off the beam splitter in a direction of an optical axis and irradiates a measurement workpiece with the white light beam, the interference objective lens generating interference between a measurement light beam obtained by reflection of the white light beam off the measurement workpiece and a reference light beam obtained by branching of the white light beam to be converged on the measurement workpiece; and
a polarization corrector that corrects the white light beam to enter the interference objective lens to circularly polarized light, the polarization corrector being arranged between the white light source and the interference objective lens,
wherein the polarization corrector includes the beam splitter having a reflection surface for the white light beam, a dielectric film provided on the reflection surface of the beam splitter for reflection of the white light beam, a polarizing plate positioned between the white light source and the beam splitter, and a quarter-wave plate positioned between the beam splitter and the interference objective lens.

2. A white-light interferometric measuring device comprising:
a white light source that emits a white light beam;
a beam splitter that reflects the white light beam;
an interference objective lens that collects the white light beam having reflected off the beam splitter in a direction of an optical axis and irradiates a measurement workpiece with the white light beam, the interference objective lens generating interference between a measurement light beam obtained by reflection of the white light beam off the measurement workpiece and a reference light beam obtained by branching of the white light beam to be converged on the measurement workpiece; and a polarization corrector that corrects the white light beam to enter the interference objective lens to circularly polarized light, the polarization corrector being arranged between the white light source and the interference objective lens, wherein the polarization corrector includes the beam splitter being a non-polarizing beam splitter, and a polarizing plate and a quarter-wave plate positioned between the white light source and the beam splitter.

3. The white-light interferometric measuring device according to claim 2, wherein the beam splitter is a cube beam splitter.

4. The white-light interferometric measuring device according to claim 2, wherein the beam splitter is a beam splitter with bonded glasses.

5. The white-light interferometric measuring device according to claim 2, further comprising a collimator lens positioned between the white light source and the beam splitter, and an imaging lens positioned between the beam splitter and a light receiving element.

6. The white-light interferometric measuring device according to claim 2, wherein the interference objective lens has a focus directly formed on the white light source and a light receiving element.

7. The white-light interferometric measuring device according to claim 1, further comprising a collimator lens positioned between the white light source and the beam splitter, and an imaging lens positioned between the beam splitter and a light receiving element.

8. The white-light interferometric measuring device according to claim 1, wherein the interference objective lens has a focus directly formed on the white light source and a light receiving element.

* * * * *